United States Patent [19]

Moore

[11] Patent Number: 5,730,895
[45] Date of Patent: Mar. 24, 1998

[54] CARBOXYLATE COATED CHLORIDE SALT ICE MELTERS

[75] Inventor: William P. Moore, Hopewell, Va.

[73] Assignee: Agrinutrients Technology Group, Inc., Disputanta, Va.

[21] Appl. No.: 800,164

[22] Filed: Feb. 13, 1997

[51] Int. Cl.$^6$ ............................... C09K 3/18; B05D 5/00
[52] U.S. Cl. ..................... 252/70; 106/13; 427/220; 427/242; 427/294; 427/384; 428/403
[58] Field of Search ............................... 106/13; 252/70; 428/403; 427/220, 242, 294, 384

[56] References Cited

U.S. PATENT DOCUMENTS

| | | | |
|---|---|---|---|
| 5,064,551 | 11/1991 | Smith | 106/13 |
| 5,132,035 | 7/1992 | Hoenke et al. | 106/13 |

FOREIGN PATENT DOCUMENTS

| | | | |
|---|---|---|---|
| 375 214 | 6/1990 | European Pat. Off. | 106/13 |
| 494 506 | 7/1992 | European Pat. Off. | 106/13 |

*Primary Examiner*—Anthony Green

[57] ABSTRACT

A storage stable particulate composition for effectivly melting ice at cold temperatures without causing corrosion damage to metals it contacts in its use area, comprising primarily a water soluble chloride salt of a metal exhibiting a positive valence of from 1 to 2, such as potassium or magnesium chloride; a minor portion of a water soluble phosphate salt such as monosodium phosphate; and a substantial amount of water soluble alkaline earth metal carboxylate, such as magnesium acetate, coatingly covering the chloride and phosphate salts. Other corrosion inhibitors and modifiers of physical properties may be combined with the chloride and phosphate salts. A method of preparing the coated deicer granules is provided.

18 Claims, No Drawings

CARBOXYLATE COATED CHLORIDE SALT ICE MELTERS

FIELD OF THE INVENTION

The present invention is directed to a new storage stble deicer composition for effectively melting ice, from useful surfaces such as roadways, walkways, driveways, parking areas, bridges, porches, decks, industrial machines, buildings, and other such areas, while inhibiting corrosion of metals normally in contact with an ice melter used in such areas. The present invention is also directed to a method for preparing these new ice melter compositions.

BACKGROUND OF THE INVENTION

In cold weather water freezes on many surfaces useful to man, making them hazardous, and frequently totally useless. For many years ordinary rock salt, sodium chloride, has been used to melt ice. Other chloride salts, such as calcium chloride, potassium chloride, and magnesium chloride, provide improved ice melting over sodium chloride. All of these chloride salts are aggressively corrosive, particularly in solutions in contact with air. These salts, when used as ice melters, corrode metals which they contact, and that corrosion contributes strongly to the deterioration of metal structures, such as highway bridges, concrete reinforcing metal members, structural members of buildings, and of vehicles.

The chloride salts are quite water soluble, so that when they are used to melt ice, they are washed quickly from the surface to which they were applied, and carried away in solution, leaving little residual salt absorbed on the use surface. Thus, when ice is again deposited on the surface from snow, sleet, or rain, the residual salt concentration is too low to prevent refreezing.

Repeated thawing and refreezing and chemical corrosion by the chloride salts on porous surfaces, such as Portland Cement Concrete, and asphalt, cause spalling and rapid deterioration of the surfaces.

In recent years magnesium and calcium acetates have been used as granular ice melters, providing reduced metal corrosion rates, and little surface deterioration from spalling. These slowly dissolving materials are reported in the prior art to function best when prepared by coprecipitation as a calcium magnesium acetate mixed salt, or as a mixture of calcium acetate and magnesium acetate, with a molecular ratio of calcium to magnesium of 3 to 7.

Methods of preparing the calcium magnesium acetate (known as CMA) are provided by Rynbrandt in U.S. Pat. No. 5,219,483, and by Gancy in U.S. Pat. No. 5,162,580.

Potassium acetate, potassium formate, and potassium propionate, and sodium acetate, have been used in special cases for ice melting, usually as aqueous solutions. Urea and ethylene glycol have been used for deicing airport runways and aircraft.

All of the last mentioned ice melters may be used in some special cases, but all may be classified as too expensive for general use. The earlier mentioned chloride salts are too corrosive, do not effectively prevent refreezing, and cause spalling of treated concrete and asphalt surfaces.

Physical blends of calcium magnesium acetate and chloride salts have been reported. These blends improve the corrosion attacks on metals in their areas of use but, require large amounts of the costly calcium magnesium acetate to significantly reduce corrosion and spalling. Between 20 and 40 percent CMA is required to obtain significant corrosion and spalling reductions.

These physical blends, like the, more or less, pure chloride salts, are very difficult to effectively store. They as the pure chloride salts, absorb moisture, form clumps, and eventually form large, hard agglomerates which may not be effectively distributed by ordinary mechanical means. Thus, when the ice melter is urgently needed, time must be taken to break up agglomerates before the ice melter may be loaded for distribution onto iced areas.

Some corrosion inhibitors are reported to be used with the chloride salts to reduce corrosion rates on metal, but they do not decrease the quick wash away of the salt, do not decrease refreeze, and do not decrease the incidence of surface deterioration of Portland Cement Concrete and asphalt. Most importantly, the prior art inhibitors do not improve the poor storability and conditioning of the chloride salts.

OBJECTS OF THE INVENTION

It is a primary object of this invention to provide an economical, effective, storage stable ice melter which causes no corrosion damage to metals it contacts in its use area.

It is another primary object of this invention to provide a closely defined composition for an economical, effective, storage stable ice melter, which causes no spalling damage to Portland Cement Concrete and asphalt surfaces.

It is another primary object of this invention to provide an effective physical and chemical structure for a storage stable, and readily usable, ice melter.

It is another primary object to provide an ice melter structure which effectively melts ice and inhibits refreezing.

It is another primary object of this invention to provide an effective method of preparing an economical, effective, storage stable ice melter which causes no corrosion damage to metals the ice melter contacts in its use area.

It is another primary object of this invention to provide a method of protectively coating chloride salts treated with corrosion inhibitors, so that the coated products prevent refreezing, and are storage stable.

SUMMARY OF THE INVENTION

I have now discovered a new, economical, and storage stable, particulate composition for effectively melting ice at cold temperatures without causing corrosion damage to metals it contacts. The new composition comprises primarily low cost chloride salt particles of a metal exhibiting a positive valence of from one to two, such as potassium chloride, and magnesium chloride. The chloride salt particles homogeneously contain minor amounts of water soluble phosphate salt, such as monoammonium phosphate. A moderate amount of alkaline earth carboxylate, such as magnesium acetate or calcium acetate, coatingly covers the surface of the salt particles. The specific materials in the composition, their amounts relative to each other, and the physical structure of the coated particles provide the surprisingly effective new ice melter of this invention.

The discovery includes a new and effective method of preparing the new composition, the method requiring homogeneously admixing the chloride salt with the soluble phosphate salt and a small amount of water until damp granules are formed, and then rolling the granules in alkaline earth carboxylate powder until the granules are coated. The damp granules are then dried to form hard, attrition resistant coated ice melter granules.

DESCRIPTION OF THE INVENTION

The present invention is directed to a storage stable particulate deicer for effectively melting ice at cold temperatures without causing corrosion damage to metals it contacts in its use area, and to a method of preparing the deicer.

In the new composition, it was discovered that large portions of economical and effective cold temperature ice melter salts could be used. These effective salts, chloride salts of metals exhibiting positive valences of from one to two, are normally aggressively corrosive on iron, steel, and aluminum, metals frequently contacted by deicers. To allow the use of these salts, it was found necessary that they be comingled with minor amounts of water soluble phosphate salts, and covered with substantial amounts of water soluble alkaline earth metal carboxylates.

Surprisingly, between 80 and 98 percent of a water soluble chloride salt of a metal exhibiting a positive valance of from one to two can be effectively used if its pH is between 6 and 9. The minor amounts of soluble phosphate salts required are between 0.1 and 10.0 percent, and the substantial amounts of water soluble alkaline earth carboxylate coatings necessary to provide effective ice melting, good storage stability, inhibit refreezing, and to ameliorate metal corrosion damage, are between 1.9 and 19.9 percent, the percents referring to the total ice melter composition of the present invention.

All parts and percentages stated herein are by weight unless specifically stated to be other. The term positive valence is used herein to indicate the relative number of negative valence units required to form a neutral salt from positive and negative ions. For example, the metal magnesium with a positive valence of 2 forms a neutral salt with two chloride non metals, each exhibiting a negative valence of 1. The pH numbers given are for 10 percent aqueous solutions.

Water soluble chloride salts of metals exhibiting positive valences of from 1 to 2 found to be effective components of the new composition are potassium chloride, sodium chloride, magnesium chloride, calcium chloride, and mixtures of these salts.

It was found that any of the foregoing chloride salts could be effectively used in amounts between 82 and 90 percent of the new composition, and obtain ice melting at very low temperatures.

The composition requires minor amounts of water soluble phosphate salts. Ammonium phosphate, sodium phosphate, potassium phosphate, ammonium pyrophosphate, ammonium polyphosphate, sodium pyrophosphate, sodium tripolyphosphate, and potassium pyrophosphate are buffering agents, and all of them function well in the composition when used in amounts between 1 and 3 percent. These phosphate salts provide economical improvement to the corrosion characteristics of the chloride salts, but do not by themselves provide the level of corrosion resistance desired, nor do they provide adequate storage stability or protection against refreezing.

To obtain the benefits of the new composition, a water soluble alkaline earth metal carboxylate must be coatingly used. Effective metal carboxylates, magnesium acetate, magnesium formate, calcium acetate, calcium formate, magnesium propionate, calcium propionate, and mixtures in any ratio of the foregoing carboxylates are effective when coated on the salt particles. Particularly economical and effective compositions are obtained when the alkaline carboxylate consists of a mixture of calcium and magnesium acetates in a molecular ratio of 1 calcium to 2 magnesium.

The basic composition of this invention provides good corrosion inhibition for metals present in areas of deicing. Particularly good corrosion protection for iron and aluminum may be obtained by admixing between 0.01 and 1.0 percent of additional corrosion inhibitors with the soluble phosphate salt.

Effective additional corrosion inhibitors are sodium nitrite, sodium thiosulfate, ammonium nitrite, ammonium thiosulfate, sodium silicate, ammonium thiocyanate, and sodium thiocyanate.

An especially economical, effective and storage stable composition for melting ice and preventing its refreezing while inhibiting corrosion of metals it contacts comprises between 85 and 90 percent of magnesium chloride, at a pH between about 6.0 and 8.0, mixed with between 2 and 3 percent monoammonium phosphate, between 0.1 and 1.0 percent sodium nitrite and between 0.1 and 1.0 percent sodium silicate to form homogeneous granules, and between 8 and 13 percent of magnesium acetate and calcium acetate combined in a Mg to Ca molecular ratio of from 1.0 to 5.0, covering the homogeneous granules as a coating.

Another especially effective composition is obtained when potassium chloride is used in lieu of the magnesium chloride in the foregoing composition.

It is not necessary that the coatings of this invention perfectly seal off the underlying granules, and it is desirable that there be sufficient holes through the coating to allow penetration of water so that the chloride, phosphate salts, and corrosion inhibitors can readily dissolve. The alkaline earth carboxylates dissolve more slowly than the chloride salts and cover much of the treated surface areas. This residue provides extended deicing effects and prevents quick wash away and refreezing.

Thickeners provide an additional deterrent to refreezing after the use of the present ice melter. Additional protection against refreezing is obtained when between 0.5 and 5.0 percent of carboxyalkyl cellulose is added to the foregoing composition. Carboxymethyl cellulose is particularly effective in decreasing the diffusion of deicer materials from treated surfaces and preventing refreezing. It is also economical.

The composition and structure of the present invention effectively provide storage stable, attrition resistant, coated granular deicers for effectively melting ice, preventing refreezing, and inhibiting corrosion of metals and spalling of Portland Cement Concrete and asphalt surfaces when prepared by a new and effective method.

In this method, between 80 and 98 percent of a water soluble chloride salt of a metal exhibiting a positive valence of from 1 to 2 in powder form which also exhibits a pH between 6 and 9, are admixed with between 0.1 and 5.0 percent of a water soluble phosphate salt powder, containing between 0.01 and 1 percent of sodium nitrite until a homogeneous powder mixture is formed.

The term powder is used to indicate finely divided particles normally fine enough to pass through a 12 mesh Standard Tyler Screen, and preferably passing through a 20 mesh screen.

Water amounting to between 4 and 20 percent is then admixed with the homogeneous powder mixture until the chloride and phosphate salt powders agglomerate and form damp homogeneous granules.

The damp homogeneous granules are then rolled by mechanical means with between 5 and 19.9 percent of water soluble alkaline earth metal carboxylate powder until the alkaline earth metal carboxylate forms a coating covering the damp homogeneous granules.

An alternate economical and effective method of coating the damp granules with water soluble alkaline earth metal carboxylate is the reaction of an alkaline earth metal base with a carboxylic acid on the surface of the granule. It was found that this procedure formed a harder surface than the alkaline earth metal carboxylate powder and improved resistance to attrition. Alkaline earth bases which effectively react on the surface to form coatings on the granule surface are magnesium oxide, magnesium hydroxide, magnesium carbonate, calcium oxide, calcium hydroxide, and calcium carbonate. Mixtures of the foregoing bases also function effectively. Carboxylic acids which react effectively with the bases to form the metal carboxylates are: formic, acetic, and propionic. Mixtures of the carboxylic acids may also be used.

For example, a dry mixture of calcium and magnesium oxide powders is coatingly added to a rolling bed of damp homogeneous granules and then sprayed with a stoichiometrically equal amount of strong acetic acid to form a calcium magnesium acetate coating. The thickness of the coating may be increased by adding several layers of the thus formed calcium magnesium acetate.

The coated granules are then dried at temperatures between 60° and 120° C. until the moisture contents of the granules are less than 5 percent, thereby forming storage stable, attrition resistant, coated deicer granules.

The use of vacuum facilitates drying of the coated granules at the low temperatures of between 60° and 100° C. Optimum drying is obtained when the absolute pressure is maintained between 10 and 350 millimeters of mercury.

The method produces particularly effective deicers when the dried coated granules are screened to provide product granules passing through 4 mesh Tyler Standard Screens and retained on 12 mesh Screens.

When drying of the coated granules is continued until their moisture contents are between about 0.5 and 2.0 percent, the hardness and resistance to attrition of the coated granules increases to where more than a one pound weight is required to break the coating on a single granule of deicer. If the drying is continued further, the coaing becomes softer, and subject to high attrition rates.

EXAMPLES OF THE PREFERRED EMBODIMENT

The examples provided here demonstrate the utility of the present invention and its preferred embodiment.

Example 1

The first two examples demonstrate the preferred deicer composition and its utility as an effective ice melter. The composition selected for testing comprised granules, 96 percent of which passed through a 4 mesh Tyler Standard Screen and was retained on a 12 mesh Screen. The magnesium acetate was used as a coating on the magnesium chloride, monoammonium phosphate, add sodium nitrite homogeneous granules. The chemical composition of the granules is listed as follows:

| Components | Wt % |
|---|---|
| Magnesium Chloride | 85.0 |
| Monoammonium Phosphate | 2.0 |
| Sodium Nitrite | 0.1 |
| Magnesium Acetate (Coating) | 12.1 |

-continued

| Components | Wt % |
|---|---|
| Moisture | 0.8 |
| Total | 100.0 |

Freezing points were measured on this composition starting with dry ice induced very cold temperatures and allowing samples to warm slowly until melting occurred. The resulting freezing-melting points are recorded in the following table:

| ICE MELTERS TESTED | FREEZING POINTS, °C., FOR AQUEOUS CONCENTRATIONS | | |
|---|---|---|---|
| | 10% (wt) | 20% (wt) | 30% (wt) |
| EXAMPLE 1 | −5 | −17 | −29 |
| COMMERCIAL CALCIUM MAGNESIUM ACETATE 3 MOLS Ca/7 MOLS Mg | −3 | −11 | −23 |
| UREA | −2 | −6 | −11 |

Example 2

In a further test using the deicing materials of Example 1, a block of Portland Cement concrete was taken from a walkway, cut to 1 square foot area two inches thick, placed in a freezer at a temperature of −7° C. Water was sprayed onto the block until an ice layer of about one-eighth inch thickness covered the block. Then, one-tenth of a pound (45 grams) of the Example 1 granules were evenly applied on the ice layer. The block was inspected one hour after application and the ice was melted, and it was found that most of the melt was no longer on the block. The block was wiped one time with a flat iron bar, and remained in the freezer at −7° C. After the block had cooled to −7° C., it was again sprayed with the same amount of water as in the initial freeze. The block contained traces of ice, which could easily be wiped off with the flat iron bar, but almost all of the water remaining on the block was in liquid form.

In the same tests using commercial calcium magnesium acetate, essentially none of the ice was melted in one hour with almost all of the grains remaining intact. After 24 hours appreciable melting had occurred but much of the deicer was still in solid form. When melting was eventually completed and the surface raked clear, the calcium magnesium acetate also inhibited refreezing of the second dose of water sprayed on the block at −7° C.

The urea was ineffective at melting the ice at −7° C. and did not inhibit refreezing during a second water spraying.

Example 3

This example demonstrates that the deicer composition of this invention may be used without causing corrosion damage to metals it contacts. This demonstration was carried out by a series of corrosion tests. Samples of carbon steel A-36 and aluminum 6061 were prepared by cutting them in the form of coupons ⅛" thick×¾" wide×1½" long, and polishing the coupons. The coupons were suspended by glass threads in two-thirds full 200 ml beakers with two-thirds of the coupon in the fluids and one-third of the coupon out of the fluid. The beakers were not agitated and remained in test for 20 days, using duplicate tests. At the end of the test period, the coupons were removed, dried, polished back to their original condition and weighed. The corrosion tests were run with comparative tests using sodium chloride (salt), calcium chloride, magnesium chloride, and commercial calcium magnesium acetate (3 mols Ca per 7 mols Mg). All tests were made with 10 percent solutions of the deicers. The corrosion test results are summarized in the following table.

| ICE MELTERS SOLUTIONS | CORROSION RATES MILS/YR ON | |
|---|---|---|
| | STEEL A-36 | ALUMINUM 6061 |
| EXAMPLE 1 | 1 | 0.07 |
| NaCl | 13 | 0.3 |
| CaCl$_2$ | 11 | 2.1 |
| MgCl$_2$ | 12 | 3.2 |
| COMMERCIAL CMA | 3 | 0.09 |

None of the corrosion tests with Example 1 composition showed appreciable pitting, scaling, or corrosion, which would indicate damage to the aluminum and iron metals tested.

Example 4

This example demonstrates the reduced spalling of Portland Cement Concrete and asphalt surfaces when treated with deicer compositions of this invention.

The block of Portland Cement Concrete of Example 2, believed to be non-air entrained, and a similarly sized block taken from a 4 year old asphalt walkway were surface cleaned with a wire brush and then put through 20 freeze-thaw cycles using the composition of Example 1, calcium chloride and urea. The thawing was performed at −2° C. with each freeze-thaw cycle completed in about 48 hours. After the 20th thaw, the blocks were dried, surface cleaned, and all of the loose scales and powder which were recovered during the freeze-thaw cycles and the final dry brushings were collected and weighed. The loss was attributed to spalling of the sample surfaces. The amounts of spalling for the test materials are recorded in the following table.

| | Wt LOSS, (lbs per square foot) ON | |
|---|---|---|
| TEST MATERIALS | CONCRETE | ASPHALT |
| EXAMPLE 1 | .059 | .076 |
| CALCIUM CHLORIDE | .148 | .221 |
| UREA | .231 | .247 |

Example 5

This example demonstrates the preferred method of preparing the composition of the present invention.

To a 300 liter Littleford high intensity mixer were added the following powder ingredients:

| Ingredients (all −20 mesh Tyler Screen) | lbs |
|---|---|
| Potassium Chloride | 81.0 |
| Monoammonium Phosphate | 2.0 |
| Sodium Nitrite | 0.1 |
| Total | 83.1 |

The above listed salts were mixed at a temperature of 60° C. until a homogeneous mixture was obtained in 4 minutes. With the plows operating in the Littleford mixer, 5 pounds of water was sprayed onto the salts over a period of 2 minutes so that soft, damp, granules were formed, which were primarily in the size range of Tyler Screens −6+30 mesh.

To these soft granules in the Littleford machine was added 16.9 pounds of a ground mixture of magnesium and calcium acetates containing 1 magnesium molecule per 0.5 molecule of calcium, and fine enough to pass a 40 mesh Tyler Screen. The fine, dry, acetates were allowed to coat onto the damp, homogeneous salt granules for 4 minutes while the Littleford machine plows continued to operate.

The Littleford mixer was then closed and a vacuum to reduce absolute pressure to 50 mm of mercury was applied and maintained on the coated granules. Temperature was increased to 85° C. over a period of one hour. The vacuum was cut off, the system vented and the dry coated granules discharged from the Littleford, cooled to ambient temperature and bagged in paper bags.

Crush tests were performed on the −6+8 mesh granules. An average of 3.5 pounds of weight was required to break the coating on the granules.

After six months storage in 50 pound paper bags, the deicer granules were inspected and found to be free-flowing and ready for immediate use as a deicer.

I claim:

1. A storage stable, particulate deicer composition for effectively melting ice without causing corrosion damage to metals it contacts, the composition comprising:

(a) between 80 and 98 percent of a water soluble chloride salt of a metal, exhibiting a positive valence of from 1 to 2, the salt exhibiting a pH between 6 and 9;

(b) between 0.1 and 10 percent of a water soluble phosphate salt comingled with the chloride salt; and (c) between 1.9 and 19.9 percent of water soluble alkaline earth metal carboxylate coating the chloride and phosphate salts.

2. The particulate composition of claim 1 wherein the water soluble chloride salt is selected from the group consisting of: potassium chloride, sodium chloride, magnesium chloride, calcium chloride, and mixtures thereof.

3. The particulate composition of claim 1 wherein the water soluble chloride salt amounts to between 82 and 90 percent.

4. The particulate composition of claim 1 wherein the water soluble phosphate salt is selected from the group consisting of: ammonium phosphate, sodium phosphate, potassium phosphate, ammonium pyrophosphate, ammonium polyphosphate, sodium pyrophosphate, sodium tripolyphosphate, and potassium pyrophosphate.

5. The particulate composition of claim 1 wherein the water soluble chloride salt amounts to between 82 and 90 percent.

6. The particulate composition of claim 1 wherein the water soluble alkaline earth metal carboxylate is selected from the group consisting of: magnesium acetate, magnesium formate, calcium acetate, calcium formate, magnesium propionate, calcium propionate, and mixtures thereof.

7. The particulate composition of claim 1 wherein the water soluble alkaline earth metal carboxylate comprises a mixture of calcium and magnesium acetates in a molecular ratio of about 1 calcium to 2 magnesium.

8. The particulate composition of claim 1 wherein between 0.01 and 1 percent of corrosion inhibitor is admixed with the water soluble phosphate salt, the inhibitor being selected from the group consisting of: sodium nitrite, sodium thiosulfate, ammonium nitrite, ammonium thiosulfate, sodium silicate, ammonium thiocyanate, and sodium thiocyanate.

9. A coated granular composition for effectively melting ice, preventing its refreezing, and inhibiting corrosion of metals it contacts, the composition comprising:

(a) between 85 and 90 percent of magnesium chloride, exhibiting a pH between about 6.0 and 8.0;

(b) between 2 and 3 percent of monoammonium phosphate, between 0.1 and 1.0 percent sodium nitrite and between 0.1 and 1.0 percent sodium silicate mixed with magnesium chloride to form homogeneous granules; and (c) between 8 and 13 percent of magnesium acetate and calcium acetate combined in a magnesium to calcium molecular ratio of from 1.0 to 5.0, coating the homogeneous granules.

10. The coated granular composition of claim 9 wherein the magnesium chloride is replaced by potassium chloride.

11. The coated granular composition of claim 9 wherein between 0.5 and 5 percent of carboxyalkyl cellulose is included in the magnesium chloride to improve resistance to refreezing of ice.

12. A method of preparing a storage stable, attrition resistant, coated granular deicer composition for effectively melting ice, preventing its refreezing, and inhibiting corrosion of metals and spalling of Portland Cement Concrete and asphalt surfaces, the method comprising:

(a) admixing between 80 and 98 percent of a water soluble chloride salt of a metal exhibiting a positive valence of from 1 to 2 in powder form exhibiting a pH between 6 and 9, with between 0.1 and 5 percent of a water soluble phosphate salt powder containing between 0.01 and 1 percent of sodium nitrite until a homogeneous powder mixture is formed;

(b) admixing water amounting to between 4 and 20 percent with the homogeneous powder mixture until the chloride and phosphate salt powders agglomerate to form damp homogeneous granules;

(c) rolling the damp homogeneous granules by mechanical means with between 5 and 19.9 percent of water soluble alkaline earth metal carboxylate until the alkaline earth metal carboxylate forms a coating covering the damp homogeneous granules; and (d) drying the coated granules at temperatures between 60° and 120° C. until the moisture contents of the granules are between 0.5 and 5 percent, thereby forming storage stable, attrition resistant, coated deicer granules.

13. The method of claim 12 wherein the coated granules are vacuum dried at a temperature between 60° and 100° C. at absolute pressures between 10 and 350 millimeters of mercury.

14. The method of claim 12 wherein the dried coated granules are screened to pass through a 4 mesh Tyler Standard Screen to be retained on a 12 mesh Tyler Standard Screen.

15. The method of claim 12 wherein the drying of the coated granules is continued until the moisture contents of the granules are between about 0.5 and 2.0 percent, thereby hardening the coated granules so that a weight of at least one pound is required to break the coating of a single granule.

16. The method of claim 12 wherein the water soluble alkaline earth metal carboxylate is formed as a coating covering the damp homogeneous granules by reaction of an alkaline earth metal base with a carboxylic acid.

17. The method of claim 16 wherein the alkaline earth metal base is selected from the group consisting of magnesium oxide, magnesium hydroxide, magnesium carbonate, calcium oxide, calcium hydroxide, calcium carbonate, and mixtures thereof.

18. The method of claim 16 wherein the carboxylic acid is selected from the group consisting of formic acid, acetic acid, propionic acid, and mixtures thereof.

* * * * *